United States Patent [19]
Böck

[11] Patent Number: 5,807,070
[45] Date of Patent: Sep. 15, 1998

[54] BEARING ARRANGEMENT FOR THE ROTOR OF A RADIAL OR DIAGONAL FLOW COMPRESSOR

[75] Inventor: Alexander Böck, Dahlewitz, Germany

[73] Assignee: BMW Rolls-Royce GmbH, Oberursel, Germany

[21] Appl. No.: 730,454

[22] Filed: Oct. 15, 1996

[30] Foreign Application Priority Data

Oct. 12, 1995 [DE] Germany .................. 195 37 998.5

[51] Int. Cl.⁶ .................................................. F04D 29/04
[52] U.S. Cl. .......................... 415/132; 415/131; 415/229; 415/173.2; 29/407.01; 29/888.02; 29/889.2; 384/99; 384/519
[58] Field of Search .................................... 415/131, 132, 415/170.1, 173.2, 174.1, 229, 230, 231; 416/174, 224 R, 244 A, 246; 384/99, 517, 519; 29/407.01, 888.02, 889.2

[56] References Cited

U.S. PATENT DOCUMENTS

| | | | |
|---|---|---|---|
| 2,434,018 | 1/1948 | Stepanoff | 415/132 |
| 3,881,841 | 5/1975 | Straniti | 415/131 |
| 4,992,024 | 2/1991 | Heydrich | 415/229 |
| 5,030,018 | 7/1991 | Korenblit | 384/519 |
| 5,368,439 | 11/1994 | Piazza . | |

FOREIGN PATENT DOCUMENTS

| | | |
|---|---|---|
| 2 253 852 | 12/1973 | Germany . |
| 4024744C2 | 2/1991 | Germany . |

*Primary Examiner*—Christopher Verdier
*Attorney, Agent, or Firm*—Evenson, McKeown, Edwards & Lenahan PLLC

[57] ABSTRACT

A fixed bearing for a radial or diagonal flow compressor is guided in a damping bush whose axial position can be fixed by means of a reconciling plate to establish a desired running gap with respect to the compressor housing. The damping bush has a receiving device for a supporting element which rests against the reconciling plate, such that the supporting element and the reconciling plate are removable when the damping bush is disposed in the compressor housing. When the rotor is mounted, the required thickness of the reconciling disk can be determined and this reconciling disk can then be inserted without removing the rotor or the damping bush for the adjustment of the desired running gap.

9 Claims, 2 Drawing Sheets

BEARING ARRANGEMENT FOR THE ROTOR OF A RADIAL OR DIAGONAL FLOW COMPRESSOR

BACKGROUND AND SUMMARY OF THE INVENTION

This invention relates to a bearing arrangement for the rotor of a radial or diagonal flow compressor of the type having a fixed bearing guided in a damping bush whose axial position can be fixed by means of a reconciling plate, to maintain a desired running gap relative to the compressor housing. In addition, the invention relates to a process for adjusting the running gap while using the bearing arrangement according to the invention.

It is customary to adjust the size of the running gap between the rotor or the compressor impeller and the compressor housing, which depends on an axial positioning of the fixed bearing, by mounting the rotor twice. In this case, small wax plates are first glued onto the interior side of the compressor housing, and the power unit or the rotor is then mounted completely. By rotating the rotor in its frontmost position, the wax is scraped off the housing by the rotor blades. Thereafter, the rotor is removed, the residual wax remaining on the compressor housing is measured, and a reconciling plate is ground having the corresponding thickness. Subsequently, with the reconciling plate placed in-between, the power unit is again mounted completely, and the running gap is checked, so that the final mounting can then take place. However, because of the double mounting of the rotor in the compressor housing, this approach requires extremely high expenditures.

It is therefore an object of the present invention to provide a bearing arrangement by means of which a desired running gap can be adjusted in a simpler manner.

These and other objects and advantages are achieved according to the invention, in which the damping bush has a receiving device for a supporting element which rests against the reconciling plate, with the supporting element and the reconciling plate being removable when the damping bush is disposed in the compressor housing. Thus, without interposing the reconciling plate, the damping bush together with the rotor can first be axially displaced until the rotor blades graze the compressor housing. In this manner, by a simple measurement the required thickness of the reconciling plate can be determined. The damping bush and the rotor remain in the compressor housing, including when the required reconciling plate and the supporting element are mounted on the damping bush.

Because of the removability of the supporting element and the reconciling plate, the bearing arrangement according to the invention affords significantly simplified mounting of the rotor, which must take place only once. The reason is that the rotor does not have to be removed for measuring the thickness of the reconciling plate as well as for its mounting.

Other objects, advantages and novel features of the present invention will become apparent from the following detailed description of the invention when considered in conjunction with the accompanying drawings.

DETAILED DESCRIPTION OF THE DRAWINGS

Figure 1:
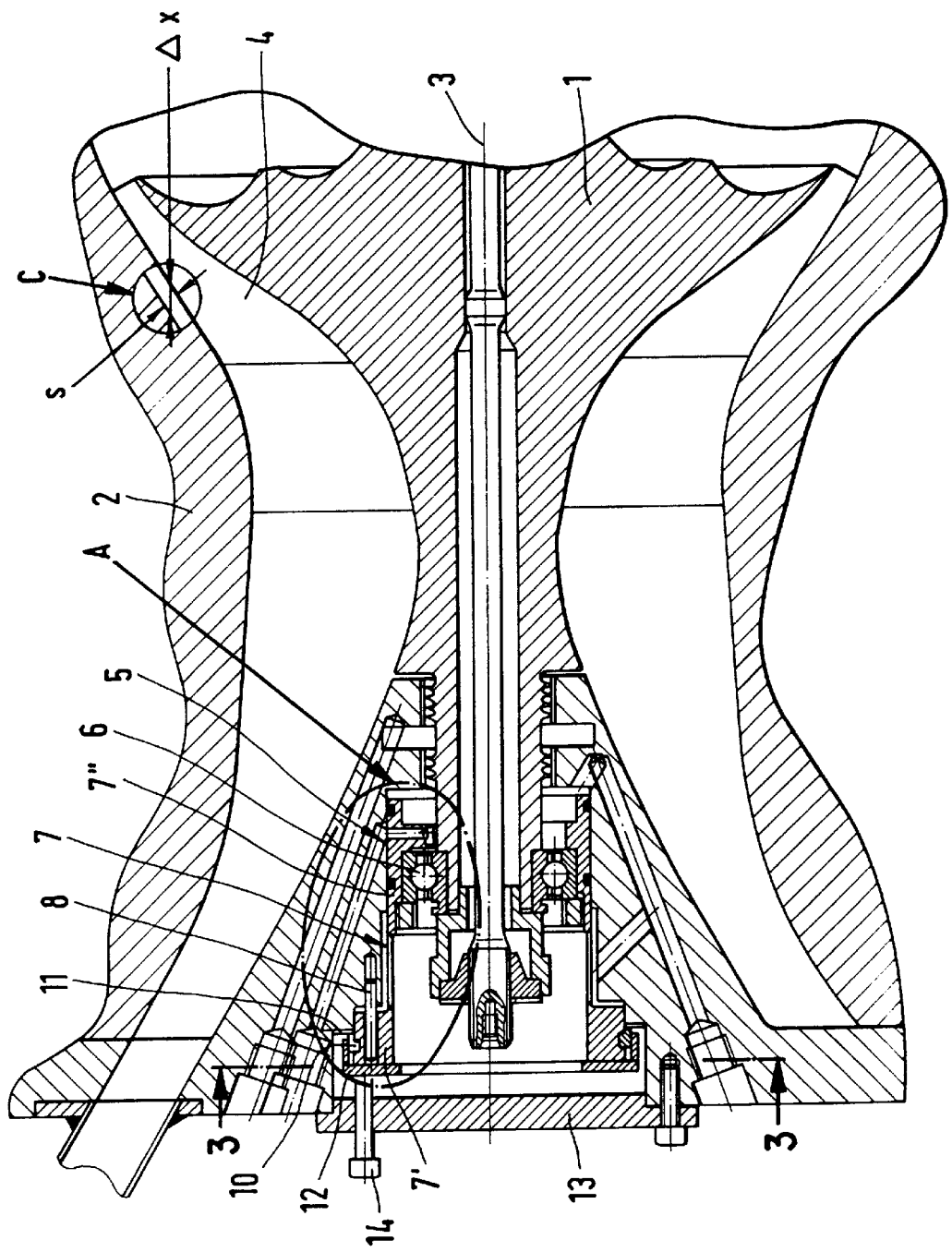
FIG. 1 is a partial sectional view of a radial or diagonal flow compressor in the area of its fixed bearing.

As depicted in FIG. 1, the rotor 1 of a radial or diagonal flow compressor is disposed in the compressor housing 2, and rotates about its axis 3. Exterior edges of the rotor blades 4 must form a certain running gap s with the compressor housing 2, as shown in an enlarged manner in FIG. 1 as the detail C. The running gap s is set by the appropriate axial positioning of the fixed bearing 5 of the rotor 1, so that the rotor 1 is shifted by a distance $\Delta x$ from a position in which it grazes the housing 2.

Figure 2:
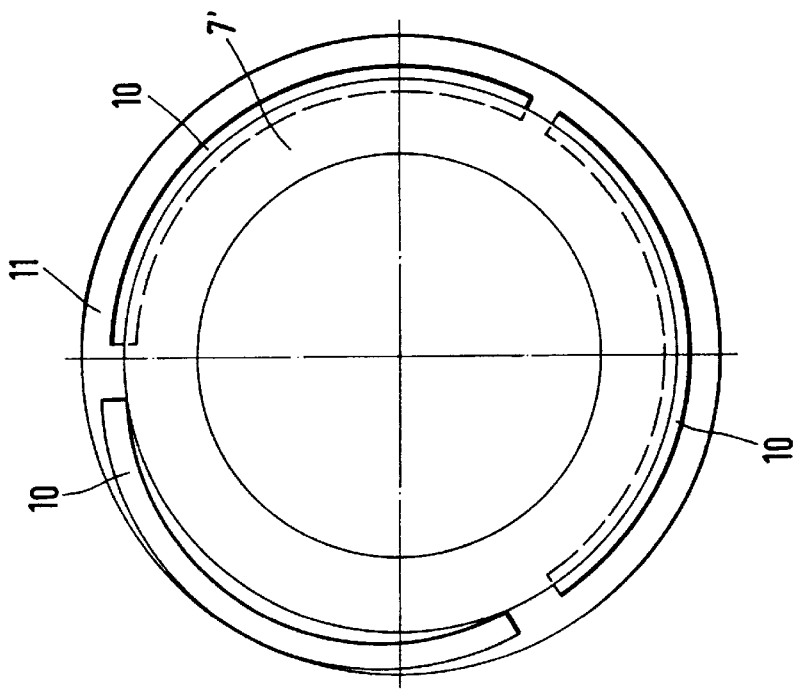
FIG. 2 is a view of the detail A from FIG. 1.

As best shown in FIG. 2, this fixed bearing 5 has a roller bearing 6 whose inner race is fixed on the shaft of the rotor 1 and whose outer race is guided in a conventional damping bush 7, the exterior section 7' of which is radially centered by way of a fit 15 in the compressor housing 2. Several guide pins 8 are distributed along the circumference and are fastened in the compressor housing 2 in order to prevent rotation of the damping bush 7. By means of this arrangement, the damping bush is thus radially centered and is guided in an axially displaceable manner (that is, in the direction of the axis 3). For the sake of completeness, it should be pointed out that the outer section 7' of the damping bush 7 is connected by way of webs with its inner section 7" which accommodates the outer race of the roller bearing 6, in order to ensure the required radial mobility of the fixed bearing 5.

Figure 3:
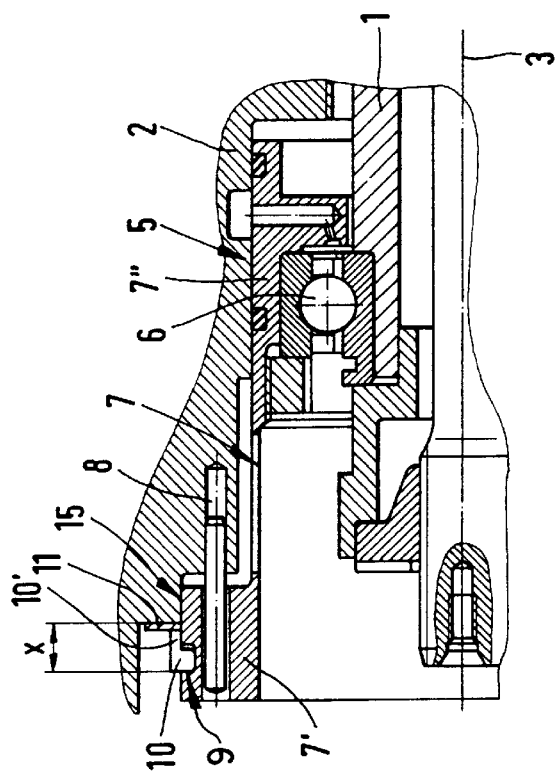
FIG. 3 is a view along section lines B—B of FIG. 1.

On its exterior side, the outer section 7' of the damping bush 7 has a receiving device in the form of an annular groove 9 for receiving a supporting element 10. The supporting element 10, in turn, consists of three ring segments which can be inserted into the annular groove/receiving device 9, as best shown in FIG. 3. Particularly FIG. 2 shows that this supporting element 10 has a collar 10' that rests against a reconciling plate 11, which can be pushed over the outer section 7' of the damping bush 7 so that it rests against the compressor housing 2.

By means of this described bearing arrangement, it is possible to adjust the desired running gap s as follows:

First, the rotor 1 with its fixed bearing 5 is mounted in the compressor housing 2, with the reconciling plate 11 and the supporting element 10 being removed. (The structural members having the reference number 12, 13, 14, which will be explained later, are not yet present in this stage.) As indicated by the preceding description, the damping bush 7 premounted on the rotor 1 is slid into the fit 15 (and onto the guide pins 8), so that it is a radially centered, while the rotor 1 can be further axially displaced with respect to the compressor housing 2. Now the rotor 1, together with its damping bush 7 is displaced axially until the blades 4 of the rotor 1 graze the compressor housing 2. (For this purpose, it is recommended that the rotor 1 be rotated continuously about its axis 3.)

When the rotor 1, together with its damping bush 7, has reached the grazing position, in which the running gap extent s has a 0 value, it can then be easily determined by a simple measuring, what axial position the rotor 1 must take up (or by which amount $\Delta x$ the rotor 1 must be displaced) so that a desired running gap extent s is obtained. The desired displacement x to be determined in this manner is illustrated in FIG. 2, and is represented as the sum of the width of the supporting element 10 and of the thickness of the reconciling plate 11. Since the width of the supporting element 10 is known, the reconciling plate 11 can now be selected with the required thickness or can be ground to the corresponding thickness. In this case, the rotor 1 remains in the compressor housing 2 together with its damping bush 7.

Now, without having to remove the rotor 1 and the damping bush 7, the reconciling plate 11 and the supporting element 10 can be mounted. For this purpose, with the supporting element 10 removed, the reconciling plate 11 is simply pushed over the outer section 7' of the damping bush 7. Thereafter, the ring segments of the supporting element 10 are inserted into the receiving device 9 in the outer section 7'. The damping bush 7 as well as the rotor 1 are now also fixed in their axial position.

In order to complete the installation, the supporting element 10 must be secured and the damping bush 7 must be fixed in a final manner. For this purpose, a fixing sleeve 12 (FIG. 1) is pushed over the ring segments of the supporting element 10 so that these ring segments or the supporting element 10 cannot fall out of the receiving device 9. Subsequently, a bearing cover plate 13 is mounted, into which closing screws 14 can be screwed which exert pressure against a collar of the fixing sleeve 12, thereby concluding the final mounting of the fixed bearing 5, and of the whole rotor 1. It should be repeated that by means of this described bearing arrangement, the running gap s can be adjusted in a simple manner without removing the rotor 1 or its fixed bearing 5 from the compressor housing. In particular, the value $\Delta x$ can also be tested in the reconciled (that is, assembled) condition because the rotor can then be displaced by precisely this value. Naturally, in this case, a plurality of details, particularly of the constructive type, can be designed differently than in the illustrated embodiment without leaving the content of the claims.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A bearing arrangement for a rotor of a radial or diagonal flow compressor having a fixed bearing guided in a damping bush, which damping bush is axially positioned by means of a reconciling plate in order to set a desired running gap between said rotor and a compressor housing, wherein:

the damping bush has a receiving device for receiving a supporting element which rests against the reconciling plate;

the supporting element and the reconciling plate are removable when the damping bush is disposed in the compressor housing;

the receiving device comprises an annular groove in an outer section of the damping bush; and the supporting element consists of several segments adapted to the receiving device.

2. A bearing arrangement according to claim 1 wherein the supporting element is held by a fixing sleeve.

3. A bearing arrangement according to claim 2 wherein the fixing sleeve is secured by closing screws in a bearing cover plate.

4. A bearing arrangement according to claim 1 wherein the outer section of the damping bush is radially centered by way of a fit in the compressor.

5. A process for adjusting a running gap of a radial or diagonal flow compressor having a fixed bearing guided in a damping bush, which damping bush is axially positioned by means of a reconciling plate in order to set a desired running gap between a rotor and a housing of said compressor, wherein the damping bush has a receiving device for receiving a supporting element which rests against the reconciling plate, the supporting element and the reconciling plate being removable when the damping bush is disposed in the compressor housing, said process comprising the steps of:

providing said damping bush with an annular groove in an outer section thereof, which annular groove forms said receiving device;

without interposing of the reconciling plate, axially displacing the damping bush together with the rotor until blades of said rotor graze the compressor housing;

determining a required thickness of the reconciling plate from a magnitude of said displacing, with the damping bush and the rotor remaining in the compressor housing; and mounting the required reconciling plate and the supporting element on the damping bush.

6. A radial or diagonal compressor comprising:

a housing;

a rotor arranged in said housing, said rotor having a fixed bearing mounted on a shaft thereof, and rotor blades which define a running gap relative to said housing;

a damping bush in which said fixed bearing of said rotor is guided;

a reconciling plate arranged on said damping bush, whereby an axial position of said damping bush is determined by said reconciling plate, and a desired width of said running gap is fixed; and a supporting element arranged in a receiving device therefor in said damping bush, which supporting element rests against said reconciling plate, wherein:

said receiving device comprises an annular groove in an outer section of said damping bush; and said supporting element and said reconciling plate are removable from said compressor with the damping bush remaining in said compressor housing.

7. A bearing arrangement for a rotor of a radial or diagonal flow compressor having a housing in which said rotor is supported, said bearing arrangement comprising:

a fixed bearing mounted on a shaft of said rotor;

a damping bush in which said fixed bearing is guided, said damping bush being supported on said housing and movable in an axial direction relative thereto;

a reconciling plate arranged on said damping bush, whereby an axial position of said damping bush relative to said housing is determined by said reconciling plate, and a width of a running gap between said housing and said rotor is fixed at a desired value; and a supporting element arranged in a receiving device therefor in said damping bush, which supporting element rests against said reconciling plate, wherein:

said receiving device comprises an annular groove in an outer section of said damping bush; and said supporting element and said reconciling plate are removable from said compressor with the damping bush remaining in said compressor housing.

8. A bearing arrangement for a rotor of a radial or diagonal flow compressor having a fixed bearing guided in a damping bush, which damping bush is axially positioned by means of a reconciling plate in order to set a desired running gap between said rotor and a compressor housing, wherein:

the damping bush has a receiving device for receiving a supporting element which rests against the reconciling plate;

the supporting element and the reconciling plate are removable when the damping bush is disposed in the compressor housing; and the supporting element is held by a fixing sleeve.

9. A bearing arrangement according to claim 8, wherein the fixing sleeve is secured by closing screws in a bearing cover plate.

* * * * *